United States Patent [19]

Grubelich

[11] 4,019,955

[45] Apr. 26, 1977

[54] VESSEL STEAM RELIEF SYSTEM FOR A NUCLEAR REACTOR

[75] Inventor: Francis Thomas Grubelich, Wethersfield, Conn.

[73] Assignee: Combustion Engineering, Inc., Windsor, Conn.

[22] Filed: Dec. 31, 1975

[21] Appl. No.: 645,494

[52] U.S. Cl. .................................. 176/38; 176/50; 176/87

[51] Int. Cl.² ................... G21C 9/00; G21C 15/24

[58] Field of Search ................... 176/37, 38, 61, 64, 176/87, 50, 51

Primary Examiner—Samuel W. Engle
Assistant Examiner—Ralph Palo
Attorney, Agent, or Firm—Stephen L. Borst; Eldon H. Luther

[57] ABSTRACT

A system is provided for the relief of excess pressure from the region above the nuclear reactor core to the cold leg on the occurrence of a loss of coolant accident. This system includes a series of passages connecting the annulus surrounding the exterior of the core barrel with the interior of the outlet nozzle or with the plenum above the reactor core. A flow blocking obstruction, such as a seal band, is held in a flow blocking position by the differential pressure experienced during normal operation of the reactor between the exterior of the core barrel and the exit region of the reactor core. Reversal of the differential pressure, which may be expected upon the occurrence of a loss of coolant accident, removes the flow blocking obstruction to permit the relief of excess pressure which may result at the outlet end of the reactor core.

10 Claims, 5 Drawing Figures

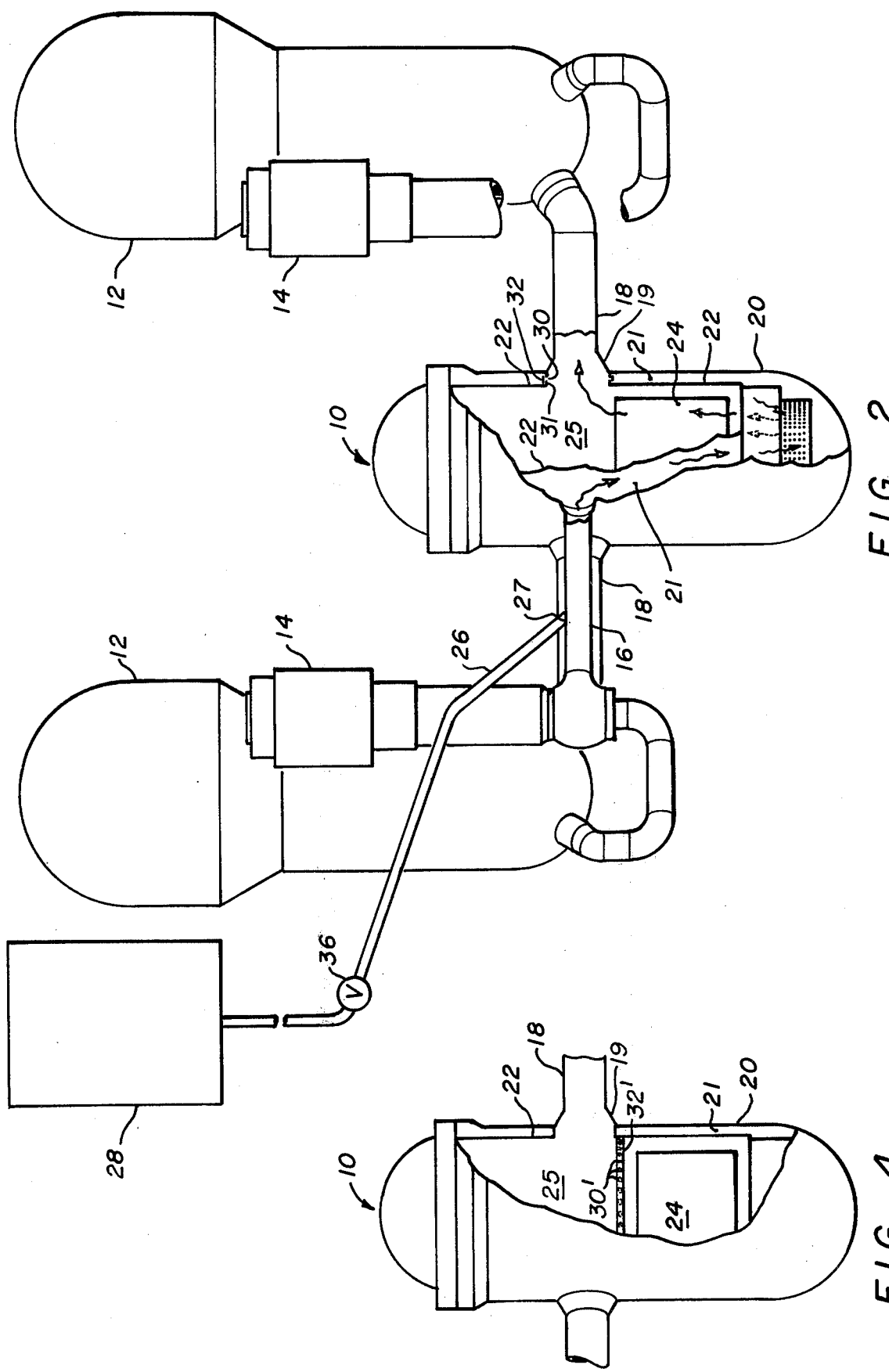

VESSEL STEAM RELIEF SYSTEM FOR A NUCLEAR REACTOR

BACKGROUND OF THE INVENTION

This invention relates to fluid cooled nuclear reactors and means for minimizing the effect of loss of coolant through a cold leg break.

In the event of an accident in which there is a break in the cold leg of the reactor coolant system, it has been postulated that the entire coolant medium which absorbs and removes the heat generated in the nuclear core will be lost or at least considerably decreased. Although control elements are inserted into the core to terminate the core's fission process upon the occurrence of such an accident, decay heat generated by the already formed fission products is capable of causing fuel or clad melting if sufficient emergency cooling of the fuel is not immediately accomplished. Furthermore, the overheating of the fuel cladding can result in a severe adverse chemical reaction in the reactor core, which may not be reversed by later cooling procedures. Accordingly, it is necessary to provide a sufficient coolant flow immediately after the accident to ensure that this heating of fuel and cladding is kept within acceptable limits.

Many prior art systems have been developed to inject emergency core coolant water into the reactor pressure vessel when such an accident occurs. If the emergency core coolant water does not reach the reactor core within the first minute following the accident, the entire reactor core, fuel and supporting structure begins to melt down and slump to the bottom of the reactor vessel. Emergency cooling water injected at this stage may well amplify the disaster as the now molten metals can react violently with water, generating large quantities of heat, releasing steam and hydrogen in amounts and at pressures that can themselves breach the containment. If the containment vessels themselves do not burst, it has been postulated that the molten mass of fuel would continue to melt downward, fed by the heat generated by fission product radioactivity.

It is the function of the emergency core cooling system to resupply the core within this first minute with coolant water in the event of the loss of primary coolant in a loss of coolant accident. The emergency core coolant water is normally injected into the inlet nozzles of the reactor and allowed to flow downwardly along the normal coolant path to the bottom of the vessel and then upwardly to the reactor core. A possible difficulty with this method of injecting emergency core coolant into the reactor is that large quantities of steam are generated by the hot core which creates a pressure buildup in the core and the reactor outlet plenum. This buildup of pressure not only impedes the further coolant from reaching the core but also may displace the water already in the core downwardly out of the core. This excess pressure also creates a further problem in that in the ordinary nuclear steam supply system, the pressure buildup has only two paths for is relief. If a break occurs in the cold leg between the reactor vessel and the coolant pump causing the loss of coolant accident, then the first path for pressure relief is down through the middle of the reactor core and up through the outer annulus between the core support barrel and the pressure vessel walls and out through the cold leg to the break. This flow is opposite to the flow of the emergency core cooling water being injected into that leg thereby impeding the flooding of the reactor core from the bottom. The second path for pressure relief is from the plenum above the reactor core out through the hot leg to the steam generator, through the steam generator and through the coolant pump to the cold leg break where the steam is discharged to the atmosphere. The steam that flows through this path is being driven by the pressure differential between the high pressure in the reactor plenum above the core and atmospheric pressure. Consequently, the steam flow rate is very high and the steam tends to drive the reactor pump like a turbine. This circumstance produces the substantial danger of over speeding the reactor coolant pump to the point where the massive fly-wheel connected to the reactor coolant pump shaft disintegrates and eventually would cause severe damage to the surrounding equipment. It is to the solution of these problems that the present invention is directed.

One prior art solution to these problems is disclosed in the April, 1970 issue of "Power Magazine" on pages 90-91. This prior art solution consists of the incorporation of a plurality of swing check valves or flapper valves in the core support shield between the plenum over the reactor core and the outer annulus between the core support shield and the reactor pressure vessel. These valves operate to equalize the pressure differential between the reactor's upper plenum and the annulus by swinging open on the occurrence of a very low differential pressure and thereby allowing the generated steam to flow directly from the reactor to the annulus and out through the cold leg rupture. These valves, however, have the difficulty that they are mounted on the interior of the reactor pressure vessel and consequently become highly radioactive. They also have the further difficulty of being somewhat complicated which increases the possibility of failure. Failure of one of these valves would substantially impair the operation of the nuclear reactor power system. Furthermore, if a physical breakdown of one of these valves were to occur, the failure may cause a loose part to be released to the incoming coolant water flow. The loose part could then possibly be swept into a flow blocking position which could cause unnecessary overheating of the reactor fuel elements, or would turbulently clatter around in the lower plenum, destroying or severely damaging critical elements that may be positioned in the lower plenum.

SUMMARY OF THE INVENTION

According to the present invention, there is provided an emergency pressure relief system for use in a reactor system. The steam relief system consists of a series of flow passages connecting the discharge region of the core and the plenum surrounding the reactor core support barrel. These passages are ordinarily closed by a band of metal which is held in place by the differential pressure existing between the hot leg and the plenum surrounding the support barrel. When the differential pressure is reversed on the occurrence of a loss of coolant accident, the reversed differential pressure opens the passages to permit fluid flow therethrough. With such an arrangement the pressure generated above the reactor core on the occurrence of a loss of coolant accident by the rupture of a cold leg is vented by means of these passages to the ruptured cold leg and out of the rupture to the reactor containment atmosphere. Accordingly, as a result of the relief of this pressure, the emergency core coolant systems can adequately respond to refill the reactor pressure vessel so that the reactor core is cooled and prevented from melting.

BRIEF DESCRIPTION OF THE DRAWINGS

FIG. 2 is another view of the reactor coolant system.

FIG. 4 shows an alternative embodiment which may replace the embodiments shown in FIGS. 1 – 3 or be a supplement thereto.

DESCRIPTION OF THE PREFERRED EMBODIMENT

Figure 1:
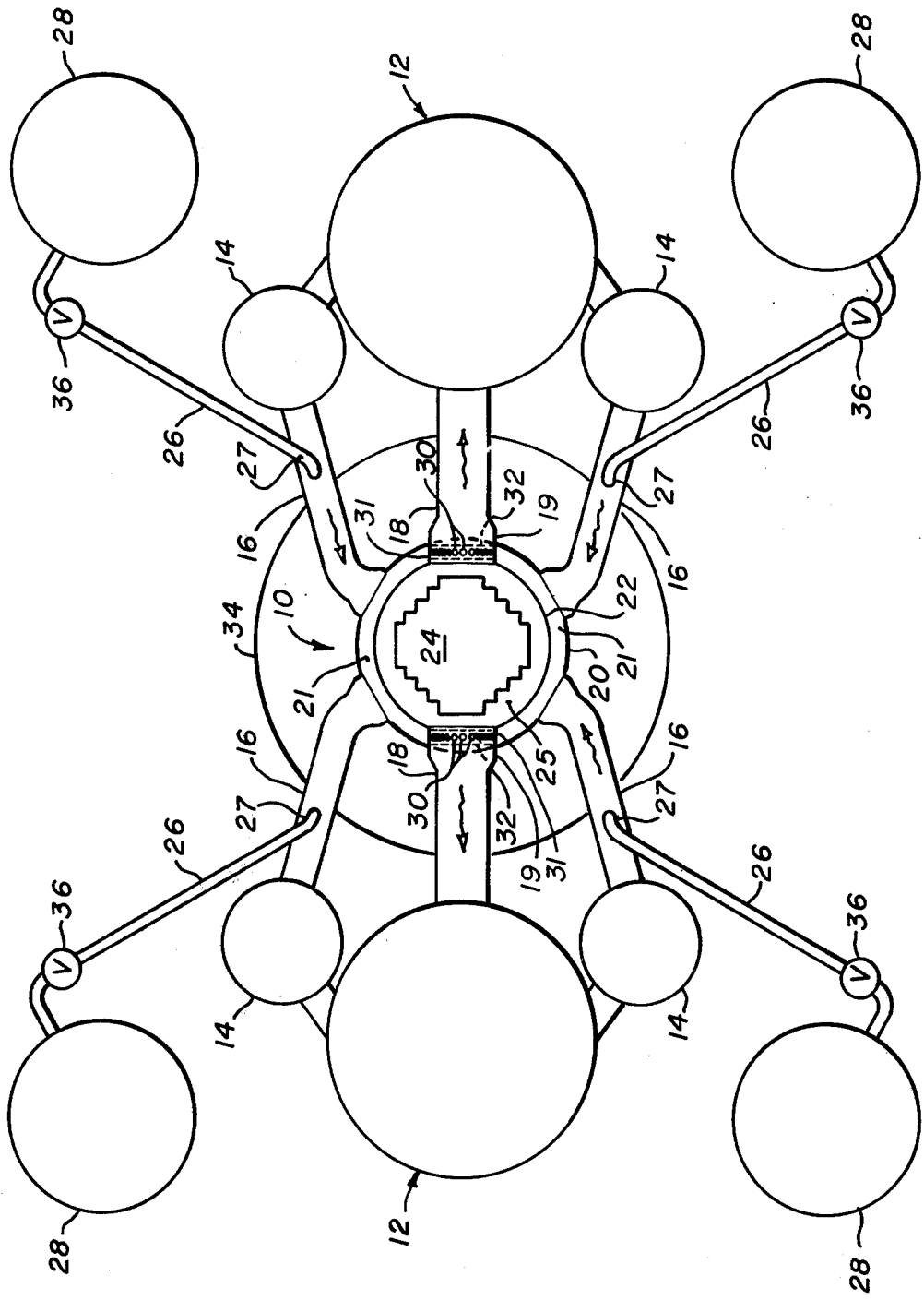
FIG. 1 is a plan view of the reactor coolant system.

Referring now to FIG. 1, there is shown a nuclear reactor 10 including a nuclear reactor pressure vessel 20 surrounded by biological shielding 34 and having an active core or fuel region 24 therein. Core 24 is supported in the reactor pressure vessel 20 in a well-known manner by core support barrel 22 which is suspended from a pressure vessel flange (not shown). The reactor coolant is circulated through the cold leg 16 by the reactor coolant pump 14. As best seen in FIG. 2, the cold coolant enters the reactor pressure vessel 20 and impinges upon the core support barrel 22. The flow of the coolant is then deflected downwardly to pass through the annular region 21 between the core support barrel 22 and the reactor pressure vessel 20 to the lower portions 23 of the reactor pressure vessel where it is deflected upwardly to pass to the interior of the reactor core support barrel. Regions 21 and 23 constitute a first region of the interior of the reactor pressure vessel 20 defined by the reactor pressure vessel 20 and the core support barrel 22. The interior of the core support vessel 22 defines a second region. Once on the interior of the reactor core support barrel 22, the coolant flows upwardly through the fuel assemblies (not shown) of the reactor core 24 and subsequently passes into the reactor plenum 25 immediately above the reactor core 24. During normal operation a pressure differential of about 20 to 50 psi exists between the first and second regions across the core. After exiting from the core the coolant is again deflected to pass out of the reactor pressure vessel 20 and into hot leg 18 by which means it is delivered to steam generator 12. During its passage through the steam generator 12, the coolant is cooled in a well-known manner by transferring its heat content to the secondary coolant system. After being cooled in the steam generator 12, the primary coolant is recirculated by the reactor coolant pump 14 and the cycle is repeated.

Also shown in FIGS. 1 and 2 is a portion of the emergency core cooling system which includes storage tank 28 check valve 36 and delivery pipe 26. Storage tank 28 contains a large quantity of highly borated water. Check valve 36 is designed to permit the passage of the borated water contained in tank 28 to the primary coolant system by means of pipe 26 when the pressure in the primary coolant system drops below a predetermined pressure. Such a pressure drop occurs with a loss of coolant accident or LOCA. The borated water is then obliquely injected into the primary coolant system at penetration 27 in the cold leg 16. This borated emergency coolant is injected under a high pressure so that the coolant is caused to flow through the cold leg 16 into the reactor vessel 20, and down through the annulus 21 between the reactor vessel 20 and the core support barrel 22 to reflood the reactor core 24 from the bottom. As discussed above, this injection and reflooding technique is impeded if a substantial steam pressure is permitted to exist in the reactor plenum 25 above the reactor core 24. Under the postulated accident a differential pressure from 300 psi to 1000 psi may be expected to develop between the first and second regions across the core.

Figure 5:
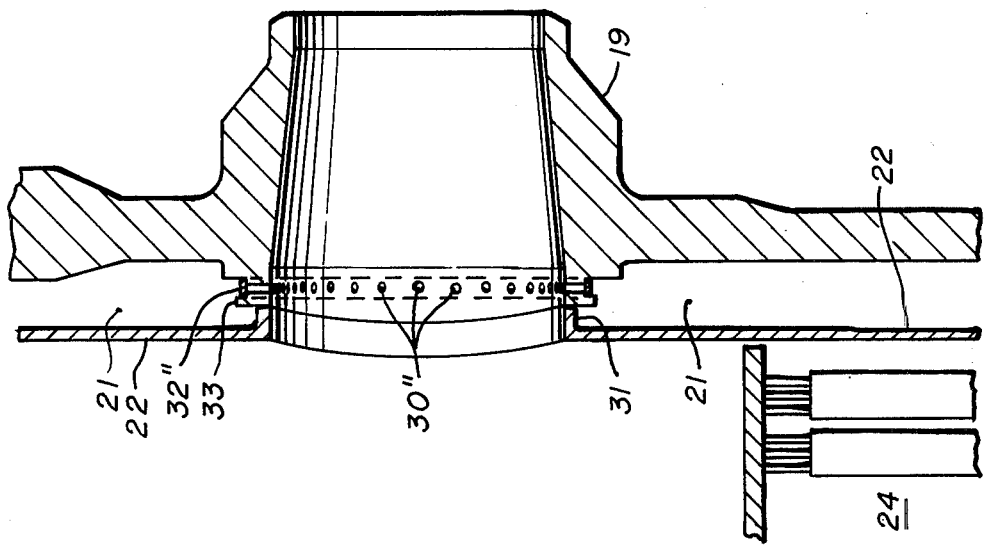
FIG. 5 shows a detail of a further embodiment in which the passages of the invention penetrate through an inwardly extending collar portion of the hot leg nozzle.
Figure 3:
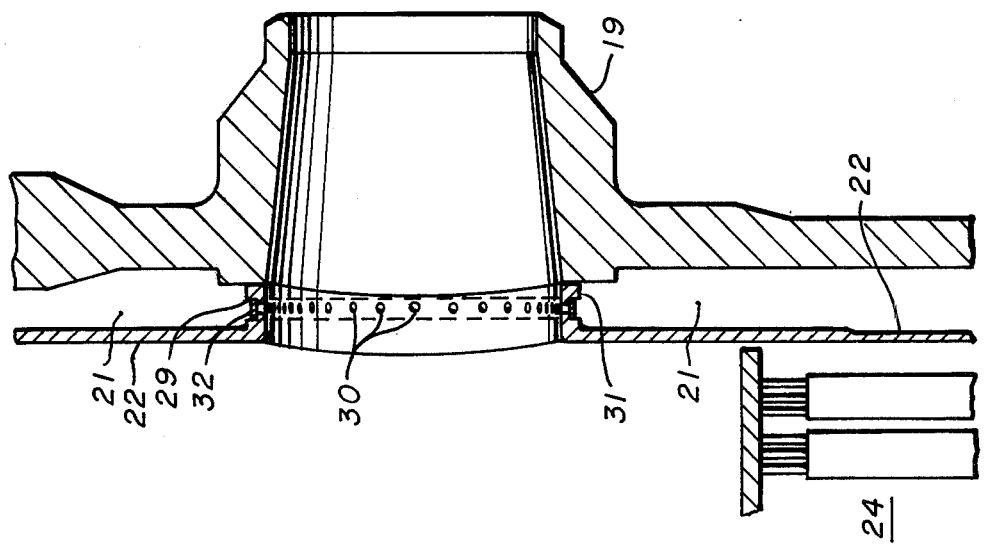
FIG. 3 is a detail of the reactor pressure vessel and the core support barrel at the location of the hot leg nozzle showing the details of the invention.

FIGS. 1 and 2 show generally the arrangement of the nuclear reactor and its components. FIGS. 3, 4 and 5 illustrate three alternate embodiments of the invention. Referring now to FIG. 3 a steam release means is shown which consists of a plurality of holes 30 drilled through the core support barrel nozzle 31 which extends laterally from the main trunk of the core support barrel 22. The core support barrel nozzle 31 is designed to interface with the pressure vessel nozzle 19 so that there is very little if any leakage from the annulus 21 into the interior of the core support barrel nozzle 31 or the reactor pressure vessel nozzle 19. In order to provide a pressure release means, holes 30 are drilled radially through the core support barrel nozzle 31. A rupturable seal band 32 fits into a groove 29 which has been also machined into the core barrel support nozzle 31. This seal band 32 encircles the exterior of the cylindrical core support barrel nozzle 31 and is fastened in flowblocking position. Thus the band 32 forms a hoop which fits snugly in the groove 29 and seals off the holes 30 drilled through the nozzle 31. The ends of the band are joined by a welding or mechanical technique to complete the hoop and to insure the positioning of the band 32 in the groove 29. In addition this stainless steel band 32 includes a predetermined reduced or weakened section to insure that the band will rupture upon the occurrence of a reversed differential pressure of sufficient magnitude (i.e. a large pressure bearing radially outwardly from the interior of the core support barrel nozzle 31). As above stated, during normal operation the normal pressure differential on the interior of the reactor pressure vessel is from the plenum region 21 toward the interior of the core support barrel or the core support barrel nozzel 31. On the occurrence of a loss of coolant accident, the differential pressure across the reactor core 24 and hence across the core support barrel 22 may be expected to be reversed in direction and increased in magnitude. Seal band 32 is designed to rupture upon this reversal of differential pressure and increase in magnitude so that a bypass flow path is created to relieve excess pressure developed above the core 24. This design has the advantage that it is an inactive system having no moving parts which may create system perturbations during normal operation of the plant and is applicable to all pressurized water reactor plants.

A second embodiment is illustrated in FIG. 4 in which the pressure relif means is created through the core support barrel 22 rather than through the core support barrel nozzle 31. Accordingly, passages 30' are drilled through the core support barrel 22 at a location above the discharge end of the core 24 so that pressure which builds in the region 25 may be vented to the annulus 21. In a manner similar to the previously described embodiment, a seal and 32' with a weakened portion is fitted into a groove girdling the reactor core support barrel 22. These circumferential holes 30' and girdling seal band 32' may be positioned around the reactor core support barrel 22 above the outlet nozzle 19 or below the outlet nozzle 19 but in all events above the reactor core 24 so that they may be available for relieving the pressure that develops in region 25.

A third embodiment is disclosed in FIG. 5 in which the reactor pressure vessel nozzle 19 has an upwardly projecting collar 33 through which the holes 30 of the invention are drilled and around which the seal band 32" is located. In a manner similar to that previously described for core support barrel nozzle 31, the inwardly extending collar 33 is adapted to interface with the reactor core support barrel 22 to permit very little if any leakage between the inside of the core support barrel 22 and the plenum region 21. Accordingly, this third embodiment provides the identical functions as previously described for the first two embodiments with the only difference being that the passages 30" are constructed in a different structural portion of the nuclear reactor system.

What is claimed is:

1. An improved nuclear reaction having a pressure vessel which has first and second nozzle penetrations therethrough, said first nozzle penetration affording an entrance for coolant into said pressure vessel and said second nozzle penetration affording an exit for coolant from said pressure vessel, a core support barrel suspended on the inside of said pressure vessel, said core support barrel separating the interior of the pressure vessel into first and second regions, said first region comprising that space which lies exterior to said core support barrel and being in fluid communication with said first nozzle penetration and said second region comprising that space which lies interior to said core support barrel and being in fluid communication with said second nozzle penetration, and a nuclear core through which coolant flows from the first region to the second region supported within said core support barrel, wherein the improvement comprising:
   a. a plurality of passages through said core support barrel arranged in a pattern which girdles a cylindrical section of said core support barrel, thereby connecting said first and second regions; and
   b. a rupturable seal band whose width is larger than the diameter of said passages, said seal band encircling the exterior of said cylindrical section of said core support barrel and held in flow blocking position adjacent to said passages.

2. The improved nuclear reactor recited in claim 1 wherein said core support barrel has a main trunk encircling said core and wherein said cylindrical section of said core support barrel through which said passages penetrate is located around the trunk of said core support barrel downstream from the discharge end of said core.

3. The improved nuclear reactor recited in claim 1 wherein said core support barrel includes a laterally extending nozzle said nozzle adapted to interface with said second pressure vessel nozzle penetration, and wherein said cylindrical section of said core support barrel through which said passages penetrate is located around said core support barrel nozzle.

4. An improved nuclear reactor having a pressure vessel which has first and second nozzle penetrations therethrough, said first nozzle penetration affording an entrance for coolant into said pressure vessel and said second nozzle penetration affording an exit for coolant from said pressure vessel, said second nozzle penetration including an inwardly extending collar, a core support barrel suspended on the inside of said pressure vessel, said core support barrel separating the interior of the pressure vessel into first and second regions, said first region comprising that space which lies exterior to said core support barrel and being in fluid communication with said first nozzle penetration and said second region comprising that space which lies interior to said core support barrel and being in fluid communication with said second nozzle penetration, and a nuclear core through which coolant flows supported within said core support barrel, wherein the improvement comprising:
   a. a plurality of passages thrugh said inwardly extending collar, thereby connecting said first and second regions; and
   b. a rupturable seal band whose width is larger than the diameter of said passages, said seal band encircling the exterior of said cylindrical section of said core support barrel and held in flow blocking position adjacent to said passages.

5. The improved nuclear reactor as claimed in claim 1 wherein said rupturable seal band is a band of stainless steel.

6. The improved nuclear reactor as claimed in claim 1 wherein said rupturable seal band includes a section of reduced strength to facilitate rupture of the band.

7. The improved nuclear reactor as claimed in claim 4 wherein said rupturable seal band includes a section of reduced strength to facilitate rupture of the band.

8. The improved nuclear reactor as claimed in claim 7 wherein said rupturable seal band is stainless steel 9. The improved nuclear reactor as claimed in claim 1 wherein said rupturable seal band is received within a groove in said core support barrel.

10. The improved nuclear reactor as claimed in claim 4 wherein said rupturable seal band is received within a groove in said core support barrel.

* * * * *